United States Patent
Heo et al.

(10) Patent No.: US 10,080,030 B2
(45) Date of Patent: Sep. 18, 2018

(54) VIDEO SIGNAL PROCESSING METHOD AND DEVICE

(71) Applicant: LG ELECTRONICS INC., Seoul (KR)

(72) Inventors: Jin Heo, Seoul (KR); Taesup Kim, Seoul (KR); Jiwook Jung, Seoul (KR); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 215 days.

(21) Appl. No.: 14/783,345

(22) PCT Filed: Apr. 11, 2014

(86) PCT No.: PCT/KR2014/003133
§ 371 (c)(1),
(2) Date: Oct. 8, 2015

(87) PCT Pub. No.: WO2014/168444
PCT Pub. Date: Oct. 16, 2014

(65) Prior Publication Data
US 2016/0037179 A1 Feb. 4, 2016

Related U.S. Application Data

(60) Provisional application No. 61/810,724, filed on Apr. 11, 2013.

(51) Int. Cl.
*H04N 7/12* (2006.01)
*H04N 19/513* (2014.01)
(Continued)

(52) U.S. Cl.
CPC ......... *H04N 19/513* (2014.11); *H04N 19/176* (2014.11); *H04N 19/44* (2014.11); *H04N 19/52* (2014.11); *H04N 19/597* (2014.11)

(58) Field of Classification Search
CPC .... H04N 19/513; H04N 19/176; H04N 19/44; H04N 19/52; H04N 19/597
See application file for complete search history.

(56) References Cited

U.S. PATENT DOCUMENTS 9,538,180 B2 * 1/2017 Zhang ................. H04N 19/597
9,596,448 B2 * 3/2017 Thirumalai .......... H04N 19/597
(Continued)

FOREIGN PATENT DOCUMENTS

CN 101641954 A 2/2010
CN 102017627 A 4/2011
(Continued)

OTHER PUBLICATIONS

Lin, Jian-Liang et al., "3D-CE5.h related: Simplification on disparity vector derivation for HEVC-based 3D video coding," Joint Collaborative Team on 3D Video Coding Extension Development of ITU-T SG 16 WP 3 and ISO/IEC JTC 1/SC 29/WG 11, JCT2-A0047, Jul. 16-20, 2012.
(Continued)

*Primary Examiner* — Nhon Diep
(74) *Attorney, Agent, or Firm* — Dentons US LLP (57) ABSTRACT

The present invention relates to a video signal processing method and device capable of: obtaining a reference view block by using a predetermined motion vector; obtaining the depth value of a reference block which corresponds to the reference view block; obtaining an inter-view motion vector for a current block by using at least one depth value of the reference depth block; and decoding the current block by using the inter-view motion vector.

10 Claims, 10 Drawing Sheets

(51) Int. Cl.
H04N 19/597 (2014.01)
H04N 19/52 (2014.01)
H04N 19/176 (2014.01)
H04N 19/44 (2014.01)

(56) References Cited

U.S. PATENT DOCUMENTS

| | | | |
|---|---|---|---|
| 2011/0274166 A1 | 11/2011 | Jeon et al. | |
| 2015/0249838 A1* | 9/2015 | Chang | H04N 19/597 375/240.16 |
| 2015/0296222 A1* | 10/2015 | Llin | H04N 19/597 375/240.16 |

FOREIGN PATENT DOCUMENTS

| | | |
|---|---|---|
| JP | 2010520697 A | 6/2010 |
| KR | 10-2010-0058471 A | 6/2010 |
| KR | 1020100066304 A | 6/2010 |
| KR | 10-2012-0068743 A | 6/2012 |
| KR | 10-115849 B1 | 6/2012 |
| KR | 10-2012-0084629 A | 7/2012 |
| KR | 10-2013-0018629 A | 2/2013 |
| WO | 2012144829 A2 | 10/2012 |
| WO | 2014166063 A1 | 10/2014 |

OTHER PUBLICATIONS

Su, Wenyi, "3DV-CE1.a: Block-based View Synthesis Prediction for 3DV-ATM," Joint Collaborative Team on 3D Video Coding Extension Development of ITU-T SG 16 WP 3 and ISO/IEC JTC 1/SC 29/WG 11, JCT2-A0107, Jul. 16-20, 2012.

Chang, Yu-Lin et al., "3CE1.h related: Depth-oriented Disparity Vector Predictor (DoDVP)," Joint Collaborative Team on 3D Video Coding Extension Development of ITU-T SG 16 WP 3 and ISO/IEC JTC 1/SC 29/WG 11, JCT3V-C0132, Jan. 17-23, 2011.

Tech, Gerhard, "3D-HEVC Test Model 3," Joint Collaborative Team on 3D Video Coding Extension Development of ITU-T SG 16 WP 3 and ISO/IEC JTC 1/SC 29/WG 11, JCT3V-C1005_d0, Jan. 17-23, 2013, XP030130664.

Gopalakrishna, Srikanth, "CE2.h related: Flexible Coding Order (FCO) and depth-first-based disparity derivation," Joint Collaborative Team on 3D Video Coding Extension Development of ITU-T SG 16 WP 3 and ISO/IEC JTC 1/SC 29/WG 11, JCT3V-C0170, Jan. 17-23, 2013, XP030130586.

Lin, Jian-Liang et al., "3D-CE5.a related: Simplification on the disparity vector derivation for AVC-based 3D video coding," Joint Collaborative Team on 3D Video Coding Extension Development of ITU-T SG 16 WP 3 and ISO/IEC JTC 1/SC 29/WG 11, JCT2-A0046, Jul. 16-20, 2012, XP030130045.

Park, Min Woo et al., "3D-CE2.h related: Simplification of disparity vector derivation," Joint Collaborative Team on 3D Video Coding Extensions of ITU-T SG 16 WP 3 and ISO/IEC JTC 1/SC 29/WG 11, JCT2-A0046, Apr. 20-26, 2013, XP030130777.

Chen, Yi-Wen et al., "3D-CE2.h related: Problem fix and simplification for DV derivation," Joint Collaborative Team on 3D Video Coding Extensions of ITU-T SG 16 WP 3 and ISO/IEC JTC 1/SC 29/WG 11, JCT3-D0104, Apr. 20-26, 2013, XP030057468.

Gerhard Tech et al., "3D-HEVC Test Model 1", Joint Collaborative Team on 3D Video Coding Extension Development of ITU-T SG 16 WP 3 and ISO/IEC JTC 1/SC 29WG 11 1st Meeting: Stockholm, SE, Sep. 20, 2012, [JCT3V-A1005_d0].

* cited by examiner

VIDEO SIGNAL PROCESSING METHOD AND DEVICE

This application is a 35 U.S.C. § 371 National Stage Entry of International Application No. PCT/KR2014/003133 filed Apr. 11, 2014, which claims benefit of and priority to U.S. Provisional Application No. 61/810,724 filed Apr. 11, 2013, both of which are incorporated by reference for all purposes as if fully set forth herein.

TECHNICAL FIELD

The present invention relates to a method and device for processing a video signal.

BACKGROUND ART

Compression refers to a signal processing technique for transmitting digital information through a communication line or storing the digital information in a form suitable for a storage medium. Compression targets include audio, video and text information. Particularly, a technique of compressing images is called video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention obtains an inter-view motion vector included in a motion vector candidate list of a current block by using a depth value of a neighboring view.

In addition, the present invention obtains the inter-view motion vector included in the motion vector candidate list of the current block from a large coding unit adjacent to a large coding unit including the current block.

Furthermore, the present invention obtains the inter-view motion vector included in the motion vector candidate list of the current block by using inter-view motion vector correction information.

The technical problems solved by the present invention are not limited to the above technical problems and those skilled in the art may understand other technical problems from the following description.

Advantageous Effects

The present invention can improve accuracy of inter-prediction by obtaining a correct inter-view motion vector and performing inter-prediction using the inter-view motion vector.

It will be appreciated by persons skilled in the art that that the effects that can be achieved through the present invention are not limited to what has been particularly described hereinabove and other advantages of the present invention will be more clearly understood from the following detailed description.

BEST MODE

The present invention provides a video signal processing method and device configured to obtain a reference view block using a predetermined fixed inter-view motion vector, to obtain a depth value of a reference block corresponding to the reference view block, to obtain an inter-view motion vector for a current block using at least one depth value of the reference depth block and to decode the current block using the inter-view motion vector.

The predetermined fixed inter-view motion vector may be a zero vector.

The at least one depth value may be a largest depth value from among a depth value of a left upper pixel of the reference depth block, a depth value of a left lower pixel of the reference depth block, a depth value of a right upper pixel of the reference depth block and a depth value of a right lower pixel of the reference depth block.

The present invention provides a video signal processing method and device configured to generate a motion vector candidate list including the inter-view motion vector and to obtain a prediction value of the current block using the motion vector candidate list.

The present invention provides a video signal processing method and device configured to obtain a motion vector index, wherein the prediction value of the current block is obtained using the motion vector index.

MODES FOR INVENTION

Techniques for compressing or decoding multiview video signal data consider spatial redundancy, temporal redundancy and inter-view redundancy. In the case of a multiview image, multiview texture images captured at two or more views can be coded in order to generate a three-dimensional image. Furthermore, depth data corresponding to the multiview texture images may be coded as necessary. The depth data can be compressed in consideration of spatial redundancy, temporal redundancy or inter-view redundancy. Depth data is information on the distance between a camera and a corresponding pixel. The depth data can be flexibly interpreted as depth related information such as depth information, a depth image, a depth picture, a depth sequence and a depth bitstream in the specification. In addition, coding can include both the concepts of encoding and decoding in the specification and can be flexibly interpreted within the technical spirit and technical scope of the present invention.

Figure 1:
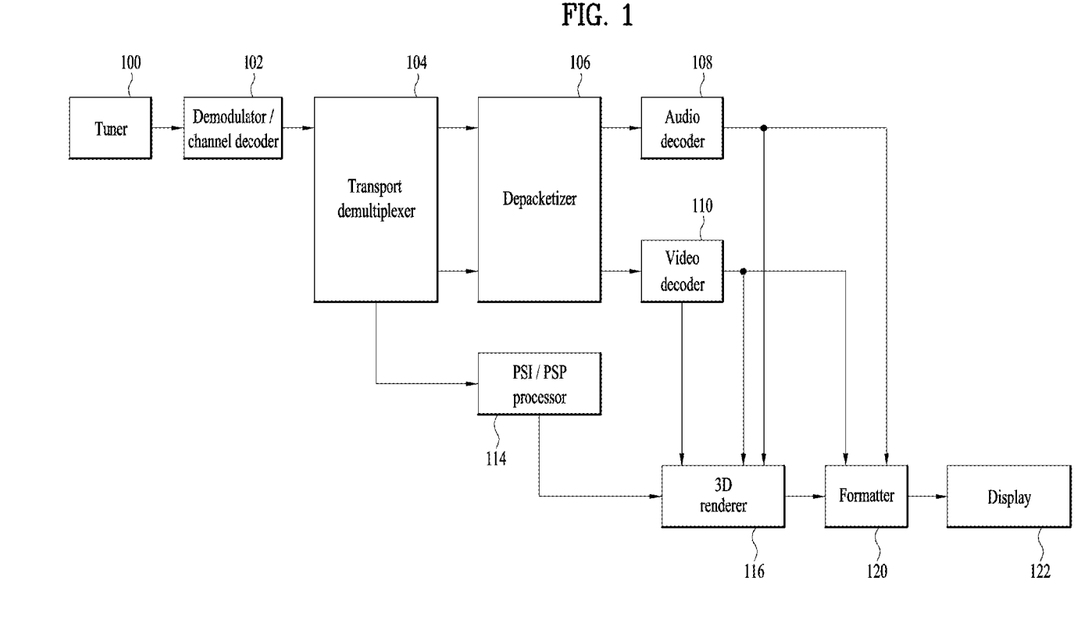
FIG. 1 is a block diagram of a broadcast receiver to which depth coding is applied according to an embodiment of the present invention.

FIG. 1 is a block diagram of a broadcast receiver to which depth coding is applied according to an embodiment to which the present invention is applied.

The broadcast receiver according to the present embodiment receives terrestrial broadcast signals to reproduce images. The broadcast receiver can generate three-dimensional content using received depth related information. The broadcast receiver includes a tuner 100, a demodulator/channel decoder 102, a transport demultiplexer 104, a depacketizer 106, an audio decoder 108, a video decoder 110, a PSI/PSIP processor 114, a 3D renderer 116, a formatter 120 and a display 122.

The tuner 100 selects a broadcast signal of a channel tuned to by a user from among a plurality of broadcast signals input through an antenna (not shown) and outputs the selected broadcast signal. The demodulator/channel decoder 102 demodulates the broadcast signal from the tuner 100 and performs error correction decoding on the demodulated signal to output a transport stream TS. The transport demultiplexer 104 demultiplexes the transport stream so as to divide the transport stream into a video PES and an audio PES and extract PSI/PSIP information. The depacketizer 106 depacketizes the video PES and the audio PES to restore a video ES and an audio ES. The audio decoder 108 outputs an audio bitstream by decoding the audio ES. The audio bitstream is converted into an analog audio signal by a digital-to-analog converter (not shown), amplified by an amplifier (not shown) and then output through a speaker (not shown). The video decoder 110 decodes the video ES to restore the original image. The decoding processes of the audio decoder 108 and the video decoder 110 can be performed on the basis of a packet ID (PID) confirmed by the PSI/PSIP processor 114. During the decoding process, the video decoder 110 can extract depth information. In addition, the video decoder 110 can extract additional information necessary to generate an image of a virtual camera view, for example, camera information or information for estimating an occlusion hidden by a front object (e.g. geometrical information such as object contour, object transparency information and color information), and provide the additional information to the 3D renderer 116. However, the depth information and/or the additional information may be separated from each other by the transport demultiplexer 104 in other embodiments of the present invention.

The PSI/PSIP processor 114 receives the PSI/PSIP information from the transport demultiplexer 104, parses the PSI/PSIP information and stores the parsed PSI/PSIP information in a memory (not shown) or a register so as to enable broadcasting on the basis of the stored information. The 3D renderer 116 can generate color information, depth information and the like at a virtual camera position using the restored image, depth information, additional information and camera parameters.

In addition, the 3D renderer 116 generates a virtual image at the virtual camera position by performing 3D warping using the restored image and depth information regarding the restored image. While the 3D renderer 116 is configured as a block separated from the video decoder 110 in the present embodiment, this is merely an example and the 3D renderer 116 may be included in the video decoder 110.

The formatter 120 formats the image restored in the decoding process, that is, the actual image captured by a camera, and the virtual image generated by the 3D renderer 116 according to the display mode of the broadcast receiver such that a 3D image is displayed through the display 122. Here, synthesis of the depth information and virtual image at the virtual camera position by the 3D renderer 116 and image formatting by the formatter 120 may be selectively performed in response to a user command. That is, the user may manipulate a remote controller (not shown) such that a composite image is not displayed and designate an image synthesis time.

As described above, the depth information for generating the 3D image is used by the 3D renderer 116. However, the depth information may be used by the video decoder 110 in other embodiments. A description will be given of various embodiments in which the video decoder 110 uses the depth information.

Figure 2:
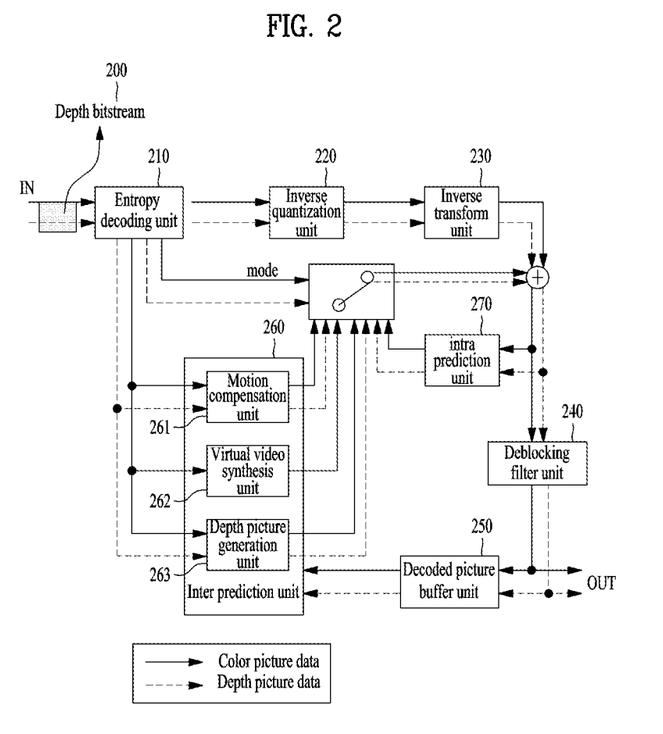
FIG. 2 is a block diagram of a video decoder according to an embodiment of the present invention.

FIG. 2 is a block diagram of the video decoder according to an embodiment to which the present invention is applied.

Referring to FIG. 2, the video decoder 110 may include an entropy decoding unit 210, an inverse quantization unit 220, an inverse transform unit 230, an in-loop filter unit 240, a decoded picture buffer unit 250, an inter prediction unit 260 and an intra prediction unit 270. In FIG. 2, solid lines represent flow of color picture data and dotted lines represent flow of depth picture data. While the color picture data and the depth picture data are separately represented in FIG. 2, separate representation of the color picture data and the depth picture data may refer to separate bitstreams or separate flows of data in one bitstream. That is, the color picture data and the depth picture data can be transmitted as one bitstream or separate bitstreams. FIG. 2 only shows data flows and does not limit operations to operations performed in one decoder.

First of all, to decode a received depth bitstream 200, the depth bitstream 200 is parsed per NAL. Here, various types of attribute information regarding depth may be included in an NAL header region, an extended region of the NAL header, a sequence header region (e.g. sequence parameter set), an extended region of the sequence header, a picture header region (e.g. picture parameter set), an extended region of the picture header, a slice header region, an extended region of the slice header, a slice data region or a macro block region. While depth coding may be performed using a separate codec, it may be more efficient to add attribute information regarding depth only in the case of depth bitstream if compatibility with existing codecs is achieved. For example, depth identification information for identifying a depth bitstream can be added to the sequence header region (e.g. sequence parameter set) or the extended region of the sequence header. Attribute information regarding a depth sequence can be added only when an input bitstream is a depth coded bitstream, according to the depth identification information.

The parsed depth bitstream 200 is entropy-decoded through the entropy decoding unit 210 and a coefficient, a motion vector and the like of each macro block are extracted. The inverse quantization unit 220 multiplies a received quantized value by a predetermined constant so as to obtain a transformed coefficient and the inverse transform unit 230 inversely transforms the coefficient to restore depth information of a depth picture. The intra-prediction unit 270 performs intra-prediction using the restored depth information of the current depth picture. The deblocking filter unit 240 applies deblocking filtering to each coded macro block in order to reduce block distortion. The deblocking filter unit improves the texture of a decoded frame by smoothing edges of blocks. A filtering process is selected depending on boundary strength and an image sample gradient around a boundary. Filtered depth pictures are output or stored in the decoded picture buffer unit 250 to be used as reference pictures.

The decoded picture buffer unit 250 stores or opens previously coded depth pictures for inter prediction. Here, to store coded depth pictures in the decoded picture buffer unit 250 or to open stored coded depth pictures, frame_num and POC (Picture Order Count) of each picture are used. Since the previously coded pictures may include depth pictures corresponding to views different from the current depth picture, depth view information for identifying views of depth pictures as well as frame_num and POC can be used in order to use the previously coded pictures as reference pictures in depth coding.

In addition, the decoded picture buffer unit 250 may use the depth view information in order to generate a reference picture list for inter-view prediction of depth pictures. For example, the decoded picture buffer unit 250 can use depth-view reference information. The depth-view reference information refers to information used to indicate dependence between views of depth pictures. For example, the depth-view reference information may include the number of depth views, a depth view identification number, the number of depth-view reference pictures, depth view identification numbers of depth-view reference pictures and the like.

The decoded picture buffer unit 250 manages reference pictures in order to implement more flexible inter prediction. For example, a memory management control operation method and a sliding window method can be used. Reference picture management unifies a reference picture memory and a non-reference picture memory into one memory and manages the unified memory so as to achieve efficient management with a small-capacity memory. In depth coding, depth pictures can be separately marked to be discriminated from color pictures in the decoded picture buffer unit and information for identifying each depth picture can be used in the marking process. Reference pictures managed through the aforementioned procedure can be used for depth coding in the inter prediction unit 260.

Referring to FIG. 2, the inter-prediction unit 260 may include a motion compensation unit 261, a virtual view synthesis unit 262 and a depth picture generation unit 263.

The motion compensation unit 261 compensates for motion of the current block using information transmitted from the entropy decoding unit 210. The motion compensation unit 261 extracts motion vectors of neighboring blocks of the current block from a video signal and acquires a motion vector prediction value of the current block. The motion compensation unit 261 compensates for motion of the current block using the motion vector prediction value and a differential vector extracted from the video signal. Motion compensation may be performed using one reference picture or a plurality of pictures. In depth coding, motion compensation can be performed using information on a reference picture list for inter-view prediction of depth pictures stored in the decoded picture buffer unit 250 when the current depth picture refers to a depth picture of a different view. Further, motion compensation may be performed using depth view information for identifying the view of the depth picture.

The virtual view synthesis unit 262 synthesizes a color picture of a virtual view using color pictures of neighboring views of the view of the current color picture. To use the color pictures of the neighboring views or to use color pictures of a desired specific view, view identification information indicating the views of the color pictures can be used. When the color picture of the virtual view is generated, flag information indicating whether the color picture of the virtual view is generated can be defined. When the flag information indicates generation of the color picture of the virtual view, the color picture of the virtual view can be generated using the view identification information. The color picture of the virtual view, acquired through the virtual view synthesis unit 262, may be used as a reference picture. In this case, the view identification information can be assigned to the color picture of the virtual view.

In another embodiment, the virtual view synthesis unit 262 can synthesize a depth picture of a virtual view using depth pictures corresponding to neighboring views of the view of the current depth picture. In this case, depth view identification information indicating the view of a depth picture can be used. Here, the depth view identification information can be derived from view identification information of a corresponding color picture. For example, the corresponding color picture can have the same picture output order information and the same view identification information as the current depth picture.

The depth picture generation unit 263 can generate the current depth picture using depth coding information. Here, the depth coding information may include a distance parameter indicating a distance between a camera and an object (e.g. a Z-coordinate value on a camera coordinate system or the like), macro block type information for depth coding, information for identifying a boundary in a depth picture, information indicating whether data in RBSP includes depth-coded data, information indicating whether a data type is depth picture data, color picture data or parallax data and the like. In addition, the current depth picture may be predicted using the depth coding information. That is, inter prediction using neighboring depth pictures of the current depth picture can be performed and intra prediction using decoded depth information in the current depth picture can be performed.

The present invention proposes a method of obtaining an inter-view motion vector for decoding a current block. A description will be given of a process of decoding the current block using the inter-view motion vector with reference to FIG. 3.

Figure 3:
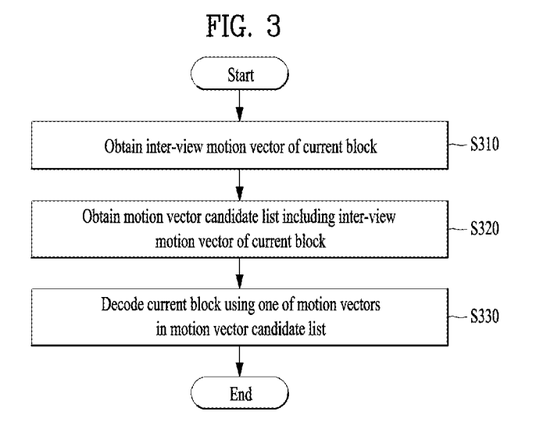
FIG. 3 is a flowchart illustrating an exemplary method of decoding a current block according to an embodiment to which the present invention is applied.

FIG. 3 is a flowchart illustrating an exemplary method of decoding the current block according to an embodiment to which the present invention is applied.

An inter-view motion vector of the current block may be obtained (S310). The inter-view motion vector can refer to a motion vector that indicates a reference block in a reference view, which is referred to by the current block in the current view. The inter-view motion vector may be derived from a neighboring block or obtained using a depth value. A method of obtaining the inter-view motion vector will be described later with reference to FIGS. 4 to 11.

A motion vector candidate list of the current block, which includes the inter-view motion vector may be obtained (S320). The motion vector candidate list may include at least one motion vector. A motion vector candidate is a motion vector that can be used to obtain a motion vector of the current block and can be obtained using temporal and spatial correlation of the current block. The motion vector candidate may include a temporal motion vector for coding the current block using a reference picture, which corresponds to the same view as the current block and a different time from the current block, and an inter-view motion vector for coding the current block using a reference picture which corresponds to a different view from the current block and the same time as the current block. The motion vector candidate can include the inter-view motion vector obtained in step S310.

The motion vector candidate list may be obtained by acquiring motion vector candidates and eliminating identical motion vector candidates from the acquired motion vector candidates. When the number of motion vector candidates is less than a predetermined maximum number of available motion vector candidates of the motion vector candidate list, the motion vector candidate list can be obtained by adding a zero vector or a predetermined motion vector candidate thereto.

The current block may be decoded using one of the motion vectors in the motion vector candidate list (S330). For example, one of the motion vectors in the motion vector candidate list can be acquired as the motion vector of the current block using a motion vector index.

A reference view block of the current block may be obtained using the motion vector of the current block. A prediction value of the current block may be obtained using a pixel value of the reference view block.

The inter-view motion vector obtained in step S310 can be included in the motion vector candidate list described with respect to FIG. 3 to be used not only for decoding the current block but also for residual prediction and view synthesis prediction (VSP).

For example, residual prediction is used to decode the current block and the inter-view motion vector can be used therefor. Residual prediction serves to obtain a residual of the current block using a residual of a reference block. The residual of the current block can be obtained using a residual of a reference block indicated by the inter-view motion vector.

Alternatively, view synthesis prediction is used to decode the current block, and the inter-view motion vector can be used therefor. View synthesis prediction refers to a prediction method which generates a virtual reference picture using a texture picture of a reference view and a depth picture of a current view or the reference view in order to obtain a prediction value of the current block. The inter-view motion vector can be used to generate the virtual reference picture.

A description will be given of first and second embodiments of obtaining an inter-view motion vector used to decode the current block with reference to FIGS. 4 to 6.

Figure 4:
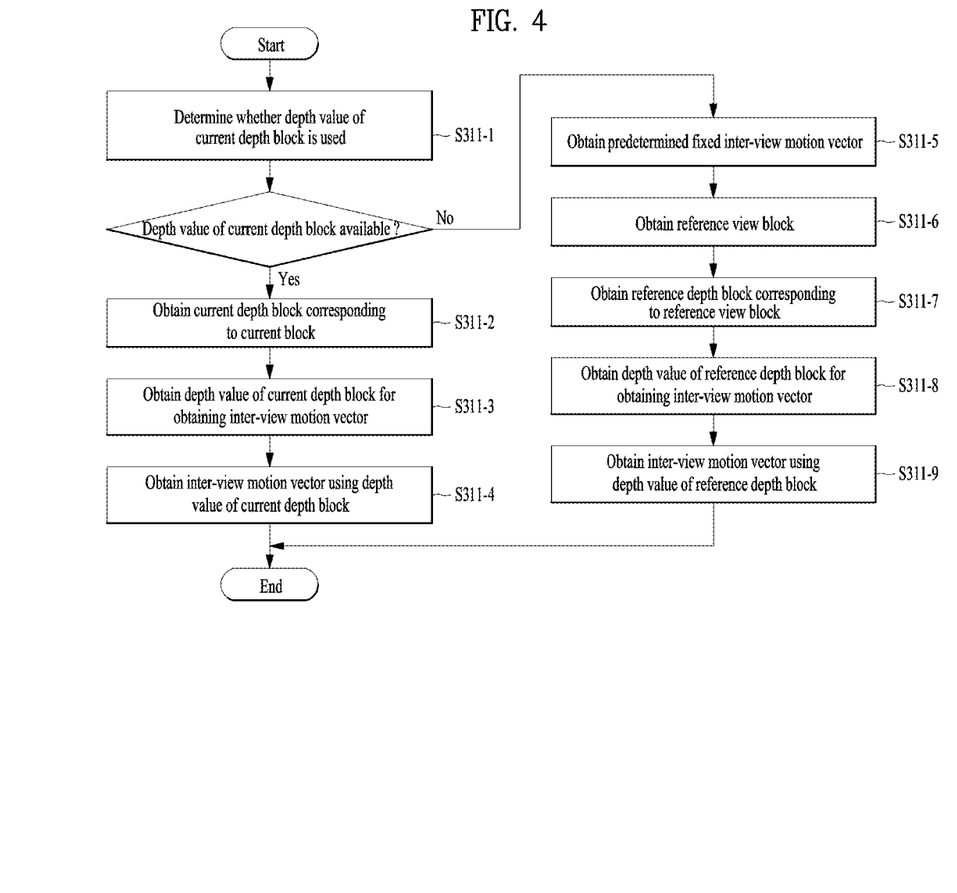
FIG. 4 is a flowchart illustrating first and second embodiments of obtaining an inter-view motion vector as embodiments to which the present invention is applied.

FIG. 4 is a flowchart illustrating the first and second embodiments of obtaining the inter-view motion vector according to the present invention.

Whether the inter-view motion vector can be obtained using a depth value of a current depth block may be checked (S311-1). Here, the current depth block is a depth block corresponding to the current block. For example, whether the inter-view motion vector is obtained using the depth value of the current depth block can be determined by checking whether the depth value of the current depth block can be used. When the current depth block has been coded and thus the current depth block can be used, it can be determined that the inter-view motion vector is obtained using the depth value of the current depth block through the first embodiment. Conversely, when the current depth has not been coded and thus the current depth block cannot be used, it can be determined that the inter-view motion vector is not obtained using the depth value of the current depth block. When the current depth block cannot be used, the inter-view motion vector can be obtained using a depth block of a reference view through the second embodiment.

When the depth value of the current depth block can be used, the current depth block corresponding to the current block can be obtained (S311-2). The position of the current depth block can be obtained using the position of the left upper pixel of the current block.

The depth value of the current depth block for obtaining the inter-view motion vector may be obtained (S311-3). The depth value of the current depth block for obtaining the inter-view motion vector may be obtained using at least one depth value of the current depth block. A largest depth value in the current depth block can be obtained by comparing all depth values in the current depth block or a most frequent depth value in the current depth block can be obtained by comparing all depth values in the current depth block. Alternatively, the mean of all depth values in the current depth block can be obtained. Alternatively, the depth value for obtaining the inter-view motion vector can be obtained by comparing specific depth values in the current depth block. Alternatively, a left upper depth value, a left lower depth value, a right upper depth value and a right lower depth value of the current depth block can be compared so as to obtain a largest depth value from among the depth values as the depth value for obtaining the inter-view motion vector. Alternatively, the left upper depth value, the left lower depth value, the right upper depth value and the right lower depth value of the current depth block can be compared so as to obtain a most frequent depth value from among the depth values as the depth value for obtaining the inter-view motion vector.

The inter-view motion vector may be obtained using the depth value of the current depth block (S311-4). A method of deriving the inter-view motion vector from the depth value is described on the basis of Equations 1 and 2.

$$Z = \frac{1}{\frac{D}{255} \times \left( \frac{1}{Z_{near}} - \frac{1}{Z_{far}} \right) + \frac{1}{Z_{far}}} \qquad \text{[Equation 1]}$$

In Equation 1, Z denotes a distance between a corresponding pixel and a camera, D is a value obtained by quantizing Z and corresponds to depth data according to the present invention. $Z_{near}$ and $Z_{far}$ respectively represent a minimum value and a maximum value of Z defined for a view including the depth data. $Z_{near}$ and $Z_{far}$ may be extracted from a bitstream through a sequence parameter set, a slice header and the like and may be information predetermined in the decoder. Accordingly, when the distance Z between the corresponding pixel and the camera is quantized at a level of 256, Z can be reconstructed using depth data $Z_{near}$ and $Z_{far}$ as represented by Equation 1. Subsequently, the disparity vector for the current texture block may be derived using reconstructed Z, as represented by Equation 2.

$$d = \frac{f \times B}{2} \qquad \text{[Equation 2]}$$

In Equation 2, f denotes the focal length of a camera and B denotes a distance between cameras. It can be assumed that all cameras have the same f and B, and thus f and B may be information predefined in the decoder.

In the present invention, the inter-view motion vector is obtained using a depth value through Equations 1 and 2 unless otherwise mentioned.

When the depth value of the current depth block cannot be used, a predetermined fixed inter-view motion vector may be obtained (S311-5). The predetermined fixed inter-view motion vector is a motion vector that indicates a reference view block in a reference view and can be determined as an inter-view motion vector obtained using a median in a range of depth values (if depth values of 0 to 255 are present, 128, which is the median, is obtained as a fixed value). Alternatively, the predetermined fixed inter-view motion vector can be determined as a zero vector. The zero vector can be represented as a motion vector (0, 0). When the zero vector is determined as the predetermined fixed inter-view motion vector, the position of a reference view block in a reference view picture, which is indicated by the predetermined fixed inter-view motion vector, can be the same as the position of the current depth block in the current depth picture.

The reference view block may be obtained using the predetermined fixed inter-view motion vector (S311-6). Here, the reference view block is a block in a reference view, which is used to decode the current block.

A reference depth block corresponding to the reference view block may be obtained (S311-7). The reference depth block is a depth block corresponding to the reference view block. The position of the reference depth block can be obtained using the position of the left upper pixel of the reference view block.

A depth value of the reference depth block for obtaining the inter-view motion vector may be acquired (S311-8). The depth value of the reference depth block for obtaining the inter-view motion vector can be acquired using at least one depth value of the reference depth block. A largest depth value in the reference depth block can be obtained by comparing all depth values in the reference depth block or a most frequent depth value in the reference depth block can be obtained by comparing all depth values in the reference depth block. Alternatively, the mean of all depth values in the reference depth block can be obtained. Alternatively, the depth value for obtaining the inter-view motion vector can be obtained by comparing specific depth values in the reference depth block. Alternatively, a left upper depth value, a left lower depth value, a right upper depth value and a right lower depth value of the reference depth block can be compared so as to obtain a largest depth value from among the depth values as the depth value for obtaining the inter-view motion vector. Alternatively, the left upper depth value, the left lower depth value, the right upper depth value and the right lower depth value of the reference depth block can be compared so as to obtain a most frequent depth value from among the depth values as the depth value for obtaining the inter-view motion vector.

The inter-view motion vector may be obtained using the depth value of the reference depth block (S311-9). The inter-view motion vector can be obtained using the above equations 1 and 2.

Figure 5:
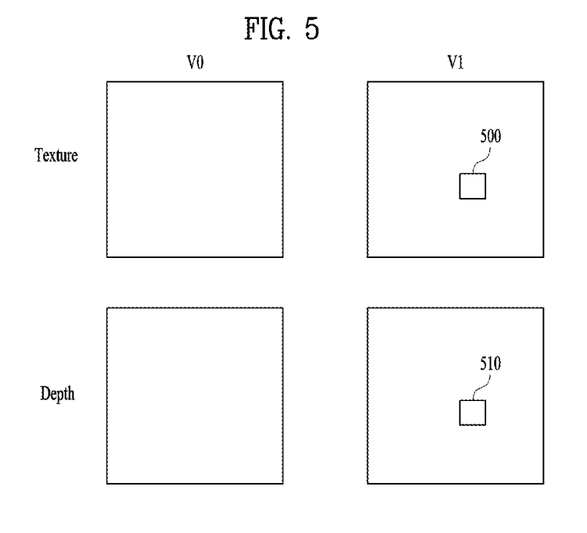
FIG. 5 illustrates the first embodiment of obtaining the inter-view motion vector as an embodiment to which the present invention is applied.

FIG. 5 illustrates the first embodiment of obtaining the inter-view motion vector as an embodiment to which the present invention is applied.

As shown in FIG. 5, the inter-view motion vector of the current block 500 can be obtained using a depth value of a current depth block 510 corresponding to the current block 500.

Specifically, depth values of the current depth block 510, which is disposed at the same position as the current block 500 of the current picture, in the current depth picture can be obtained. The inter-view motion vector can be obtained using at least one of the depth values of the current depth block 510. For example, the inter-view motion vector can be acquired using a largest depth value from among depth values corresponding to the left upper pixel, the left lower pixel, the right upper pixel and the right lower pixel of the current depth block 510.

Figure 6:
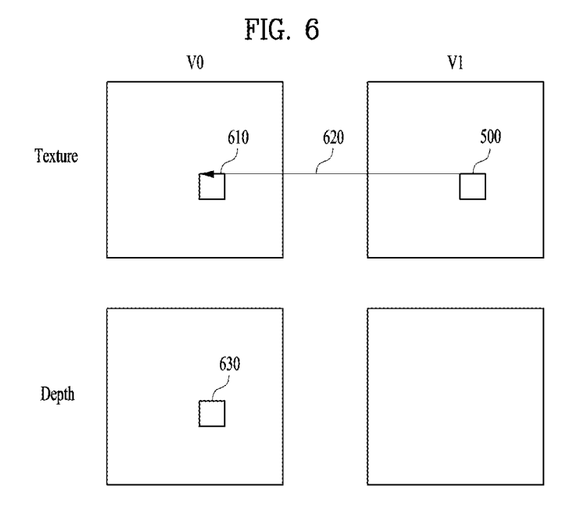
FIG. 6 illustrates the second embodiment of obtaining the inter-view motion vector as an embodiment to which the present invention is applied.

FIG. 6 illustrates the second embodiment of obtaining the inter-view motion vector as an embodiment to which the present invention is applied.

Referring to FIG. 6, the inter-view motion vector is obtained using a depth value of a reference view depth block 630 corresponding to a reference view block 610 disposed in a reference view of the current block 500. The method of obtaining the inter-view motion vector according to the second embodiment can be performed when the depth value of the current depth block 510 cannot be used in the method of obtaining the inter-view motion vector according to the first embodiment.

Specifically, a predetermined fixed inter-view motion vector 620 that indicates the reference view block 610 at the current block 500 can be used. The inter-view motion vector can be obtained using at least one of depth values of the reference view depth block 630 in the reference depth picture, which corresponds to the reference view block 610 in the reference picture. For example, the inter-view motion vector can be obtained using a largest depth value from among depth values corresponding to the left upper pixel, the left lower pixel, the right upper pixel and the right lower pixel of the reference view block 610.

A description will be given of a third embodiment of obtaining the inter-view motion vector used to decode the current block with reference to FIG. 7.

Figure 7:
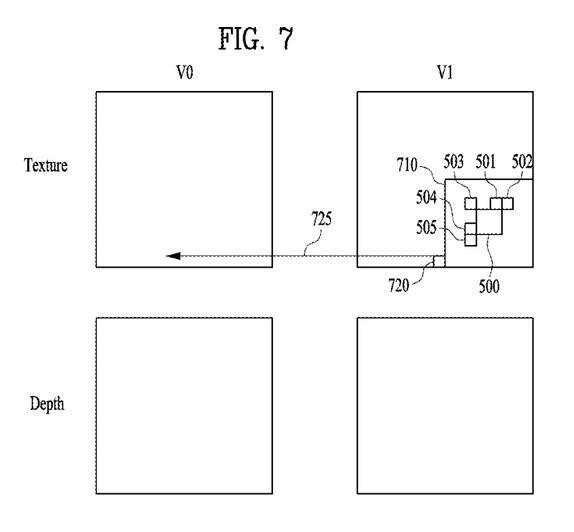
FIG. 7 illustrates a third embodiment of obtaining the inter-view motion vector as an embodiment to which the present invention is applied.

FIG. 7 illustrates the third embodiment of obtaining the inter-view motion vector as an embodiment to which the present invention is applied.

Referring to FIG. 7, an inter-view motion vector is acquired per large coding unit (LCU) and set as an inter-view motion vector of the current block 500 included in a current LCU 710. Accordingly, the same inter-view motion vector can be obtained for all blocks included in the LCU.

For example, the inter-view motion vector of the LCU can be obtained using an inter-view motion vector 675 of a block 720 in a neighboring LCU. Alternatively, the inter-view motion vector of the LCU can be obtained using an inter-view motion vector 725 of the block 720 in an LCU which has been coded immediately before the current LCU 610 is decoded.

The method of obtaining the inter-view motion vector according to the third embodiment can be performed when neighboring spatial neighboring blocks 501 to 505 of the current block 500 are not decoded using inter-view motion vectors.

Figure 8:
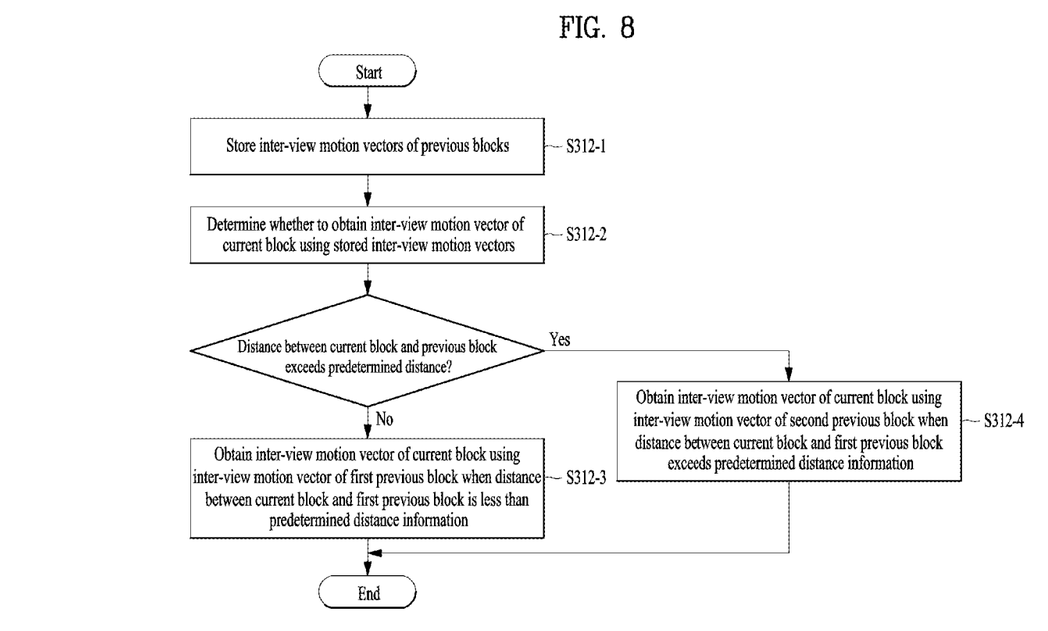
FIG. 8 is a flowchart illustrating a fourth embodiment of obtaining the inter-view motion vector as an embodiment to which the present invention is applied.

A description will be given of a fourth embodiment of obtaining the inter-view motion vector used to decode the current block with reference to FIG. 8. FIG. 8 is a flowchart illustrating the fourth embodiment of obtaining the inter-view motion vector as an embodiment to which the present invention is applied.

Inter-view motion vectors used for previous blocks coded prior to the current block may be stored (S312-1). The previous blocks may refer to blocks which have been coded using the inter-view motion vectors prior to the current block. The inter-view motion vectors may be stored in coding order. For example, when a first previous block, a second previous block and the current block are sequentially decoded using inter-view motion vectors, the inter-view motion vector used to decode the first previous block and the inter-view motion vector used to decode the second previous block can be sequentially stored. In the present embodiment, it is assumed that the first and second previous blocks are included in the above-described previous blocks, and the first previous block, the second previous block and the current block are sequentially decoded.

Whether to obtain the inter-view motion vector of the current block is determined using the stored inter-view motion vectors (S312-2). It is possible to determine whether to obtain the inter-view motion vector of the current block using the inter-view motion vectors of the previous blocks by comparing the distances between the current block and the previous blocks with predetermined distance information.

Here, the distance between the current block and a previous block can be obtained using the distance between the left upper pixel of the current block and the left upper pixel of the previous block. Alternatively, the distance between the current block and the previous block can be obtained using the distance between the center upper pixel of the current block and the center pixel of the previous block. The predetermined distance information may be information which is predetermined in order to determine whether the distance between the current block and the previous block is short or not.

When the distance between the current block and the first previous block is less than the distance corresponding to the predetermined distance information, the inter-view motion vector of the current block can be obtained using the inter-view motion vector of the first previous block (S312-3).

When the distance between the current block and the first previous block exceeds the distance corresponding to the predetermined distance information, the inter-view motion vector of the current block can be obtained using the inter-view motion vector of the second previous block, instead of the inter-view motion vector of the first previous block (S312-4).

Figure 9:
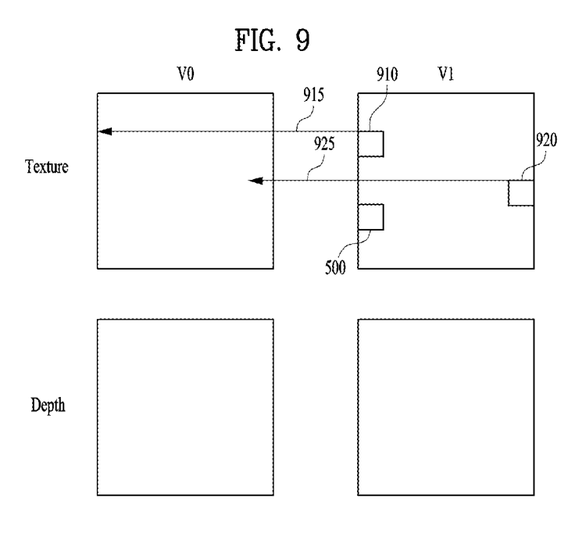
FIG. 9 illustrates the fourth embodiment of obtaining the inter-view motion vector as an embodiment to which the present invention is applied.

FIG. 9 illustrates the fourth embodiment of obtaining the inter-view motion vector as an embodiment to which the present invention is applied.

The inter-view motion vector of the current block 500 can be obtained using inter-view motion vectors derived prior to decoding of the current block 500 and stored.

Referring to FIG. 9, when a first block 910, a second block 920 and the current block 500 are sequentially decoded using inter-view motion vectors, the inter-view motion vector of the current block 500 can be obtained using the inter-view motion vector 925 of the second block 920 coded before the current block 500.

Alternatively, when the first block 910, the second block 920 and the current block 500 are sequentially decoded using inter-view motion vectors and the inter-view motion vector of a block spaced apart from the current block 500 by a predetermined distance or more is not used, the inter-view motion vector of the current block 500 can be obtained using the inter-view motion vector 915 of the first block 910, instead of the inter-view motion vector 925 of the second block 920 coded before the current block 500.

A description will be given of a fifth embodiment of obtaining the inter-view motion vector used to decode the current block.

The inter-view motion vector of the current block may be obtained using a histogram of depth values obtained prior to decoding of the current block.

For example, a most frequently obtained depth value from among depth values acquired before decoding of the current block can be used as the inter-view motion vector of the current block.

Alternatively, the mean of the depth values obtained prior to decoding of the current block can be used as the inter-view motion vector of the current block.

A description will be given of a sixth embodiment of obtaining the inter-view motion vector used to decode the current block with reference to FIGS. 10 and 11.

The inter-view motion vector of the current block can be obtained using the first to fifth embodiments and inter-view motion vector correction information. When the inter-view motion vector obtained through the first to fifth embodiments is corrected using the inter-view motion vector correction information, the inter-view motion vector of the current block can be obtained using a depth value of a reference depth block corresponding to a reference view block indicated by the inter-view motion vector acquired through the first to fifth embodiments.

Figure 10:
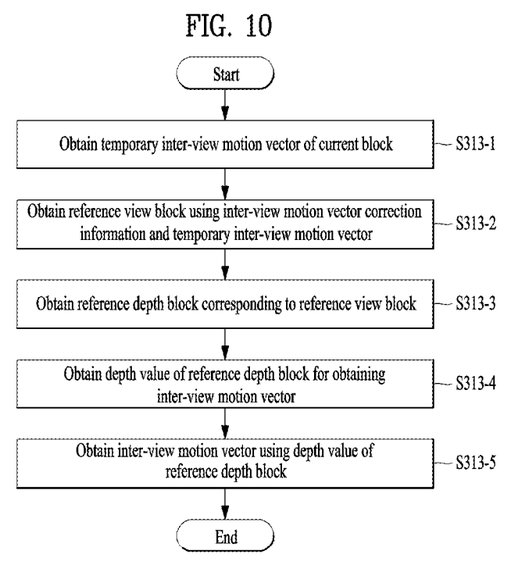
FIG. 10 is a flowchart illustrating a sixth embodiment of obtaining the inter-view motion vector as an embodiment to which the present invention is applied.

FIG. 10 is a flowchart illustrating the sixth embodiment of obtaining the inter-view motion vector as an embodiment to which the present invention is applied.

A temporary inter-view motion vector of the current block may be obtained (S313-1). Here, the temporary inter-view motion vector is a motion vector that indicates a reference view block in a reference view. The inter-view motion vector obtained using the aforementioned first to fifth embodiments may be used as the temporary inter-view motion vector. The temporary inter-view motion vector may include a zero vector and a predetermined inter-view motion vector.

The reference view block may be obtained using the inter-view motion vector correction information and the temporary inter-view motion vector (S313-2). The inter-view motion vector correction information can indicate whether to obtain the reference view block using the acquired temporary inter-view motion vector. When the inter-view motion vector correction information indicates that the reference view block is not obtained using the temporary inter-view motion vector, the temporary inter-view motion vector can be acquired as the inter-view motion vector of the current block.

When the inter-view motion vector correction information indicates that the reference view block is obtained using the temporary inter-view motion vector, a block indicated by the temporary inter-view motion vector can be acquired as the reference view block.

A reference depth block corresponding to the reference view block may be acquired (S313-3). The reference depth block is a depth block corresponding to the reference view block. The position of the reference depth block can be obtained using the position of the left upper pixel of the reference view block.

A depth value of the reference depth block for obtaining the inter-view motion vector may be acquired (S313-4). The depth value of the reference depth block for obtaining the inter-view motion vector can be obtained using at least one depth value in the reference depth block. Specifically, a largest depth value in the reference depth block can be obtained by comparing all depth values in the reference depth block or a most frequent depth value in the reference depth block can be obtained by comparing all depth values in the reference depth block. Alternatively, the mean of all depth values in the reference depth block can be obtained. Alternatively, the depth value for obtaining the inter-view motion vector can be obtained by comparing specific depth values in the reference depth block. Alternatively, a left upper depth value, a left lower depth value, a right upper depth value and a right lower depth value of the reference depth block can be compared so as to obtain a largest depth value from among the depth values as the depth value for obtaining the inter-view motion vector. Alternatively, the left upper depth value, the left lower depth value, the right upper depth value and the right lower depth value of the reference depth block can be compared so as to obtain a most frequent depth value from among the depth values as the depth value for obtaining the inter-view motion vector.

The inter-view motion vector may be obtained using the depth value of the reference depth block (S313-5). The inter-view motion vector can be obtained using the aforementioned equations 1 and 2.

Figure 11:
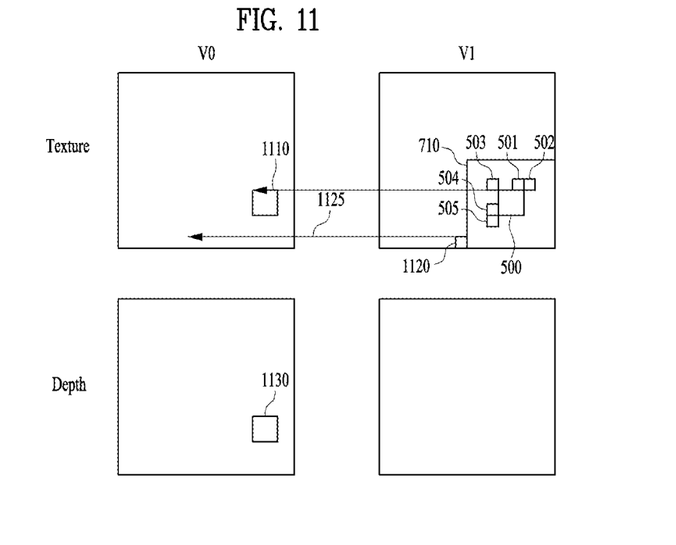
FIG. 11 illustrates an example of obtaining the inter-view motion vector of the current block using a temporary inter-view motion vector in the sixth embodiment of obtaining the inter-view motion vector as an embodiment to which the present invention is applied.

FIG. 11 is a flowchart illustrating the sixth embodiment of obtaining the inter-view motion vector as an embodiment to which the present invention is applied and shows an example of obtaining the inter-view motion vector of the current block using a temporary inter-view motion vector.

Referring to FIG. 11, a temporary inter-view motion vector 1125 of a block 1120 in a neighboring LCU is obtained using the method according to the third embodiment. When the temporary inter-view motion vector 1125 is corrected by the inter-view motion vector correction information, a reference view block 1110 included in a reference view is obtained using the inter-view motion vector 1125 of the block 1120 in the neighboring LCU. Then, the inter-view motion vector of the current block 500 can be obtained using a depth value of a reference depth block 1130 corresponding to the reference view block 1110. For example, the inter-view motion vector can be obtained using a largest depth value from among depth values corresponding to the left upper pixel, the left lower pixel, the right upper pixel and the right lower pixel of the reference depth block 1130.

As described above, a decoding/encoding apparatus to which the present invention is applied may be included in a multimedia broadcast transmission/reception apparatus such as a DMB (digital multimedia broadcast) system to be used to decode video signals, data signals and the like. In addition, the multimedia broadcast transmission/reception apparatus may include a mobile communication terminal.

A decoding/encoding method to which the present invention is applied may be implemented as a computer-executable program and stored in a computer-readable recording medium and multimedia data having a data structure according to the present invention may also be stored in a computer-readable recording medium. The computer-readable recording medium includes all kinds of storage devices storing data readable by a computer system. Examples of the computer-readable recording medium include a ROM, a RAM, a CD-ROM, a magnetic tape, a floppy disk, an optical data storage device, and a medium using a carrier wave (e.g. transmission through the Internet). In addition, a bitstream generated according to the encoding method may be stored in a computer-readable recording medium or transmitted using a wired/wireless communication network.

INDUSTRIAL APPLICABILITY

The present invention can be used to code a video signal.

The invention claimed is:

1. A method for processing a video signal by a video decoder, comprising:
    obtaining a temporary inter-view motion vector for a current block;
    obtaining inter-view motion vector correction information indicating whether a reference view block is obtained using the temporary inter-view motion vector;
    obtaining the reference view block based on the inter-view motion vector correction information and the temporary inter-view motion vector,
    wherein when the inter-view motion vector correction information indicates that the reference view block is obtained using the temporary inter-view motion vector, a block indicated by the temporary inter-view motion vector is acquired as the reference view block;
    obtaining an inter-view motion vector for the current block using a reference depth block corresponding to the reference view block, the inter-view motion vector for the current block being obtained using at least one depth value of the reference depth block; and
    decoding the current block using the inter-view motion vector for the current block,
    wherein when the inter-view motion vector correction information indicates that the reference view block is not obtained using the temporary inter-view motion vector, the temporary inter-view motion vector is acquired as the inter-view motion vector for the current block.

2. The method according to claim 1, wherein the temporary inter-view motion vector is a zero vector.

3. The method according to claim 1, wherein the at least one depth value is a largest depth value from among a depth value of a left upper pixel of the reference depth block, a depth value of a left lower pixel of the reference depth block, a depth value of a right upper pixel of the reference depth block and a depth value of a right lower pixel of the reference depth block.

4. The method according to claim 1, wherein decoding the current block comprises:
    generating a motion vector candidate list including the inter-view motion vector for the current block, and
    obtaining a prediction value of the current block using the motion vector candidate list.

5. The method according to claim 4, wherein decoding the current block further comprises obtaining a motion vector index, and
    wherein the prediction value of the current block is obtained using the motion vector index.

6. A device for processing a video signal, comprising:
    an inter-prediction unit configured to:
    obtain a temporary inter-view motion vector for a current block;
    obtain inter-view motion vector correction information indicating whether a reference view block is obtained using the temporary inter-view motion vector;
    obtain the reference view block based on the inter-view motion vector correction information and the temporary inter-view motion vector,
    wherein when the inter-view motion vector correction information indicates that the reference view block is obtained using the temporary inter-view motion vector, a block indicated by the temporary inter-view motion vector is acquired as the reference view block, obtain an inter-view motion vector for the current block using a reference depth block corresponding to the reference view block, the inter-view motion vector for the current block being obtained using at least one depth value of the reference depth block; and decode the current block using the inter-view motion vector for the current block, wherein when the inter-view motion vector correction information indicates that the reference view block is not obtained using the temporary inter-view motion vector, the temporary inter-view motion vector is acquired as the inter-view motion vector for the current block.

7. The device according to claim 6, wherein the temporary inter-view motion vector is a zero vector.

8. The device according to claim 6, wherein the at least one depth value is a largest depth value from among a depth value of a left upper pixel of the reference depth block, a depth value of a left lower pixel of the reference depth block, a depth value of a right upper pixel of the reference depth block and a depth value of a right lower pixel of the reference depth block.

9. The device according to claim 6, wherein the inter-prediction unit generates a motion vector candidate list including the inter-view motion vector for the current block and obtains a prediction value of the current block using the motion vector candidate list.

10. The device according to claim 9, wherein the inter-prediction unit obtains a motion vector index, and wherein the prediction value of the current block is obtained using the motion vector index.

\* \* \* \* \*